June 13, 1933.    W. E. HANN    1,913,984
TORSIONAL VIBRATION DAMPER
Filed April 2, 1930
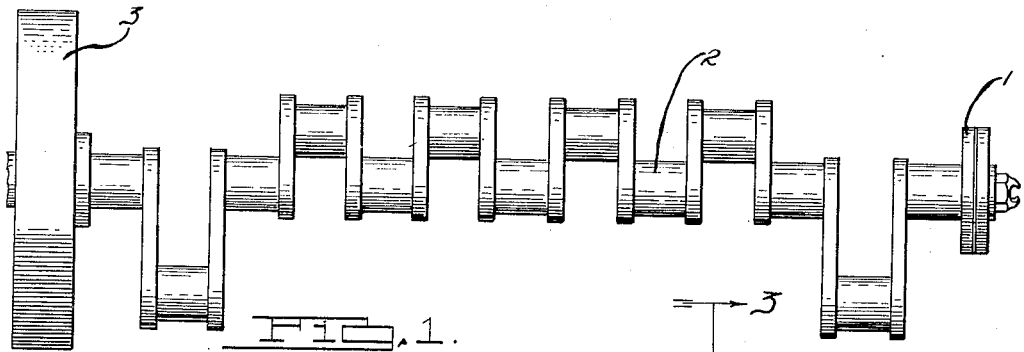
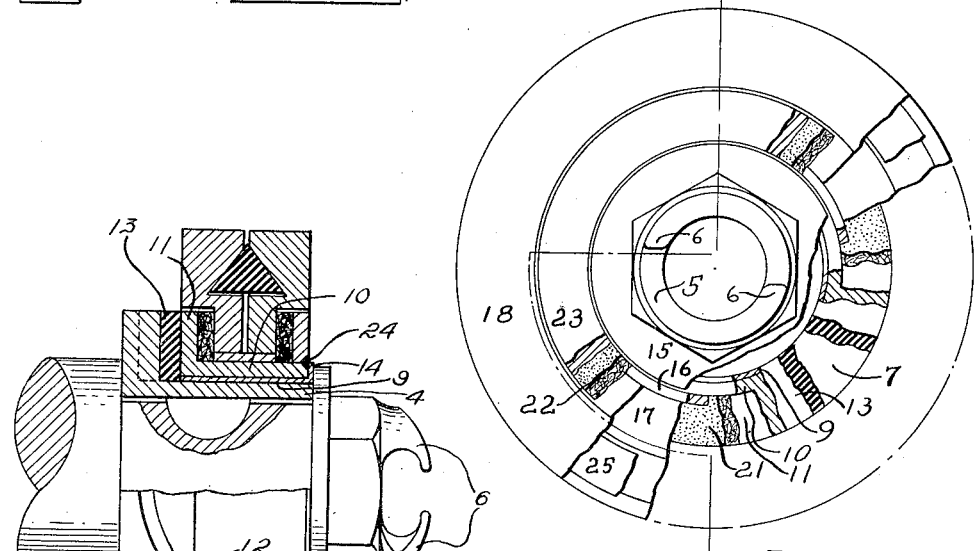
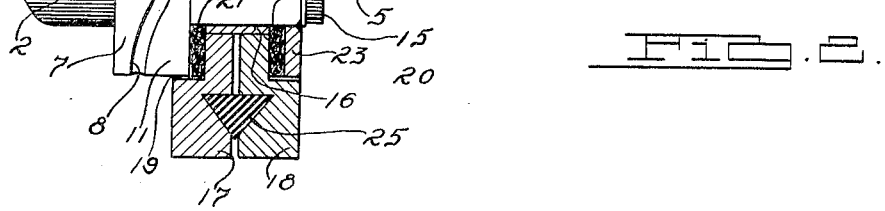
INVENTOR
William E. Hann.
BY
ATTORNEY Patented June 13, 1933

1,913,984

UNITED STATES PATENT OFFICE

WILLIAM E. HANN, OF DETROIT, MICHIGAN, ASSIGNOR TO CHRYSLER CORPORATION, OF DETROIT, MICHIGAN, A CORPORATION OF DELAWARE

TORSIONAL VIBRATION DAMPER

Application filed April 2, 1930. Serial No. 441,090.

This invention relates to torsional vibration dampers for crank shafts of engines.

Heretofore, vibration dampers of the type which employ centrifugal means for varying frictional engagement between an inertia member and a support which rotates in unison with a crank shaft have been found objectionable for the reason that at certain rotational speeds of the shaft, the friction regulating means positively locks the inertia member to the support. Under these conditions the device is incapable of varying the vibrations created by the shaft because it rotates in unison with the shaft as if it were an integral part thereof.

The main objects of this invention are to provide an improved crank shaft vibration damper which has a frictional driving connection between its respectively movable parts; to provide means for varying the pressure upon said driving connection in proportion to the speed of rotation thereof for changing the amplitude of vibration of the crank shaft during rotational speeds of a predetermined range; and to provide means for varying the amplitude of vibration of the crank shaft after the frictional varying means has become inoperative by reason of rotation at speeds in excess of the predetermined range.

An illustrative embodiment of this invention is shown in the accompanying drawing, in which:

Fig. 1 is an elevation of a crank shaft having my improved vibration damper thereon.

Fig. 2 is an end elevation, partly in section, of a damper embodying my invention.

Fig. 3 is a section taken on line 3—3 of Fig. 2.

In the form shown, my improved vibration damper 1 is mounted on the front end of a crank shaft 2 having a fly wheel 3 on its opposite end. The device has a hub part 4 which is clamped on a reduced end portion of the shaft 2 by a threaded bolt 5 having jaws 6 for engaging corresponding jaws of a crank, not shown in the drawing.

The hub part 4 has a radial flange 7 on its inner extremity which is provided with an outer waved face 8. A bearing sleeve 9 is located on the outer periphery of the tubular portion of the hub part 4. Seated on the sleeve 9 is a collar 10 which has a peripheral flange 11 at its inner extremity. The flange 11 has a waved outer face 12 conforming in shape to the waved face 8 of the flange 7. Between the waved faces 8 and 12 of the flanges 7 and 11 respectively, is located a yieldable connecting member 13, preferably comprising rubber, which is rigidly bonded to the waved faces by vulcanization or other suitable means. A suitable rigid bond may be formed between the member 13 and the waved faces by providing a film of brass on the latter before the rubber is subjected to heat and pressure of conventional vulcanizing processes.

The outer end portion 14 of the bearing sleeve 9 is bent radially outward adjacent the outer extremity of the collar 10 and a washer 15 on the bolt 5 bears against the flange portion 14 of the sleeve 9 so as to secure the hub part and collar 10 against axial movement relative to each other and to the shaft 2.

Mounted on the intermediate portion of the outer periphery of the collar 10 is a bearing sleeve 16 on which an inertia member comprising a pair of metal rings 17 and 18 is journaled. The rings 17 and 18 have recesses 19 and 20 in their respectively opposite sides in which frictional members 21 and 22 comprising clutch lining, such as fibre or fabric, are located. Seated in the outer recess 20 is a metallic ring 23 which is mounted on the outer end portion of the collar 10 and rigidly welded thereto at 24. Formed in the adjacent sides of the rings 17 and 18 are complementary angular grooves in which a weighted expansible member 25 having a triangular cross section is confined. The member 25 preferably comprises rubber in which a substantial quantity of lead peroxide is embedded in order to increase its weight.

In operation, rotation of the shaft 2 frictionally drives the inertia ring through the members 21 and 22 which are initially compressed between the sides of the grooves 19 and 20 and the sides of the flanges 11 and 23 respectively. As the inertia member is free to rotate relative to the shaft 2 it varies the amplitude of vibration of the shaft preventing the same from vibrating at a synchronous phase. The weighted member 25 is urged outwardly by centrifugal force and spreads the rings 17 and 18 apart so as to increase the pressure upon the frictional members 21 and 22 in proportion to the speed of rotation of the inertia member. This action changes the driving relation between the inertia member and the shaft 2 within predetermined rotational speeds of the shaft. When the shaft is rotated at certain high velocities the centrifugal member 25 urges the rings 17 and 18 apart with sufficient force to provide a substantially positive driving action.

Thus at high speed rotation of the device, the inertia ring and collar 10 rotate substantially in unison with each other as if they were rigidly connected. Under these conditions, the yieldable member 13 which provides a driving connection between the hub part 4 and the collar 10 permits relative movement between these parts and in so doing varies the amplitude of vibration of the crank shaft at speeds which exceed the operating limits of the frictional varying mechanism. The parts of the yieldable member 13 which are located at the crests of the respective waved surfaces are placed under tension and the parts of the member 13 between the crests are compressed, thus yieldably limiting the relative movement of the driving and driven members of the damper in an effective manner.

Although but one specific embodiment of this invention has herein been shown and described, it will be understood that various changes including the size, shape and arrangement of parts may be made without departing from the spirit of my invention and it is not my intention to limit its scope other than by the terms of the appended claims.

I claim:

1. A vibration damper comprising a hub, a rigid member associated with and movable relative to said hub, a yieldable connecting element secured to said member and hub respectively, an inertia element carried by said rigid member, and frictional means forming a driving connection between said inertia element and said rigid member.

2. A vibration damper comprising a hub, a collar mounted on said hub, a yieldable connecting element secured to said collar and hub respectively, an inertia element carried by said collar, a variable friction driving connection between said inertia element and said collar, and means operable by centrifugal force for varying the driving effect of said collar upon said inertia element in proportion to the speed of rotation of said hub.

3. A vibration member comprising a drum, a support on said drum, yieldable means forming a driving connection between said drum and said support for allowing limited relative movement therebetween, an inertia member journaled on said support, frictional means forming a driving connection between said inertia member and said support, and means for building up the pressure on said frictional means in proportion to the speed of rotation of said drum.

4. A vibration member comprising a drum, a support on said drum, yieldable means forming a driving connection between said drum and said support for allowing limited relative movement therebetween, an inertia member comprising a pair of rings journaled on said support, frictional means forming driving connections between each of said rings and said support, and centrifugal means between said rings for varying the pressure between the latter and said frictional means.

5. A vibration damper comprising a drum having a peripheral flange, a tubular support concentric with said drum having a peripheral flange, a rubber washer located between adjacent faces of said flanges and vulcanized thereto, an inertia member journaled on said support, and frictional means forming a driving connection between said inertia member and said support.

6. A vibration damper comprising a drum having a peripheral flange, a tubular support concentric with said drum having a peripheral flange, a rubber washer located between adjacent faces of said flanges and vulcanized thereto, an inertia member journaled on said support, frictional means forming a driving connection between said inertia member and said support, and means for varying the driving effect of said frictional means in proportion to the speed of rotation of said drum.

7. A vibration damper comprising driving and driven members having overlapping faces, yieldable means forming a driving connection between said overlapping faces, an inertia member on said driven member, and frictional means forming a driving connection between said inertia member and said driven member.

8. A vibration damper comprising driving and driven members having overlapping faces, yieldable means forming a driving connection between said overlapping faces, an inertia member on said driven member, frictional means forming a driving connection between said inertia member and said driven member, and means for varying the pressure between said inertia member and said frictional means.

9. A vibration damper comprising a hub part, a support carried by said hub part, an inertia member journaled on said support, a frictional driving connection between said inertia member and said support, means for varying the driving effect of said frictional connection during a predetermined range of rotational speed of said hub part, and a yieldable driving connection between said hub part and said support adapted to govern the relative movement of said hub part and inertia member when said range of speed is exceeded.

10. In a vibration damper adapted to be mounted on a crank shaft, a driving member, a driven member journalled on said driving member, a variably driving connection between said members, means for varying the driving effect of said connection to change the amplitude of vibration of said crank shaft during a predetermined range of rotational speeds thereof, and yieldable means secured to said driving member and crankshaft for changing the amplitude of vibration of said crank shaft when said range is exceeded.

11. In a vibration damper for a crank shaft, driving and driven members adapted to be concentrically mounted on said crank shaft, a variable driving connection between said members, means for varying the driving effects of said connection so as to dampen vibrations of said crank shaft during a predetermined range of rotational speeds thereof, and means including a yieldable element for yieldably securing said driving member to said crank shaft and adapted to permit rotation of said driving member relative to said crank shaft when said range is exceeded for damping vibrations of said crank shaft under such conditions.

12. A vibration damper including a collar, means for securing said collar to a rotatable member including a yieldable element, an inertia member concentric with said collar, and variable means forming a driving connection between said inertia element and said collar.

13. A vibration damper including a hub, a collar journaled on said hub, a yieldable connecting element secured to said collar and hub respectively, an inertia element concentric with said collar, and variable means forming a driving connection between said inertia element and said collar.

14. A vibration damper comprising driving and driven members having overlapping faces, yieldable means forming a driving connection between said overlapping faces, an inertia member on said driven member, frictional means forming a driving connection between said inertia member and said driven member, and means responsive to the speed of rotation of said damper for varying the pressure between said inertia member and said frictional means.

15. A vibration damper comprising driving and driven members having adjacent complementary waved surfaces, yieldable means forming a driving connection between said waved surfaces, an inertia member in related proximity to said driven member, and friction means forming a driving connection between said inertia member and said driven member.

WILLIAM E. HANN.